United States Patent
Schonfeld

[11] Patent Number: 5,975,550
[45] Date of Patent: Nov. 2, 1999

[54] TORSIONAL SHOCK ABSORBER FOR BICYCLE

[76] Inventor: Carl W. Schonfeld, 452 Marview Dr., Solana Beach, Calif. 92075

[21] Appl. No.: 09/049,266

[22] Filed: Mar. 27, 1998

[51] Int. Cl.[6] .................................................. B62K 1/00
[52] U.S. Cl. ............................................................. 280/284
[58] Field of Search .................................. 280/284, 283, 280/275, 124.167, 285, 286; 267/279, 281, 201, 219

[56] References Cited

U.S. PATENT DOCUMENTS

| | | | |
|---|---|---|---|
| 2,092,613 | 9/1937 | Olley | 267/21 |
| 2,203,342 | 6/1940 | Sloman | 267/21 |
| 2,452,758 | 11/1948 | Hutchins | 287/85 |
| 2,915,306 | 12/1959 | Hickman | 267/57.1 |
| 3,151,878 | 10/1964 | Uncles | 280/284 |
| 3,177,559 | 4/1965 | Boschi et al. | 29/149.5 |
| 4,421,337 | 12/1983 | Pratt | 280/277 |
| 5,409,249 | 4/1995 | Busby | 280/284 |

FOREIGN PATENT DOCUMENTS

| | | |
|---|---|---|
| 111274 | 8/1939 | Australia . |
| 109494 | 9/1917 | United Kingdom . |
| 174259 | 1/1922 | United Kingdom . |

Primary Examiner—Lanna Mai
Assistant Examiner—Faye M. Fleming
Attorney, Agent, or Firm—John R. Ross; John R. Ross, III

[57] ABSTRACT

A bicycle with a torsional shock absorber comprised of a torsion spring assembly. The elements of the torsion spring assembly include: housing, a shaft positioned within the housing, a rubbery substance bonded to the interior surface of the housing and the outer surface of the shaft. The torsional shock absorber is mounted on the bicycle such that shock forces are converted into rotational forces tending to rotate the shaft within the housing. These rotational forces are resisted by the spring force created by the rubbery substance within the torsion spring assembly; thereby absorbing the shock forces. In a preferred embodiment, the front and rear portions of the bicycle frame pivot about the pedal spindle axis. The housing of the torsion spring assembly is rigidly connected to the front portion of the bicycle frame in-between the top tube and middle brace and just in front of the seat tube. The rear portion of the bicycle frame is pivotally connected to two torsion arms rigidly connected to the shaft.

24 Claims, 10 Drawing Sheets

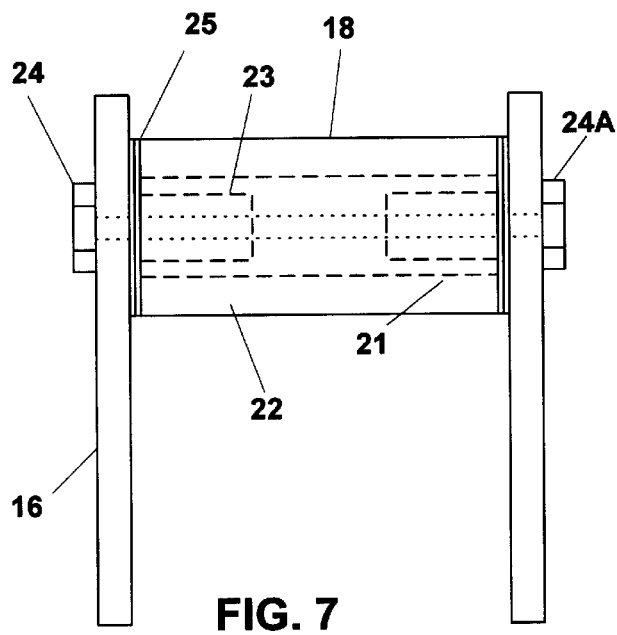
FIG. 7
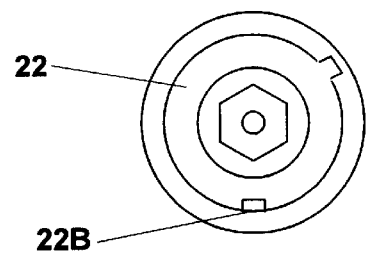
FIG. 8B
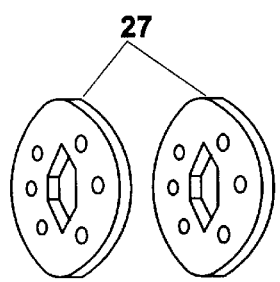
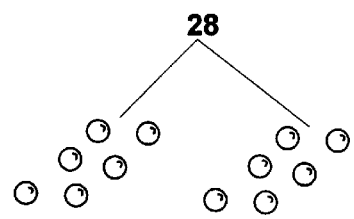
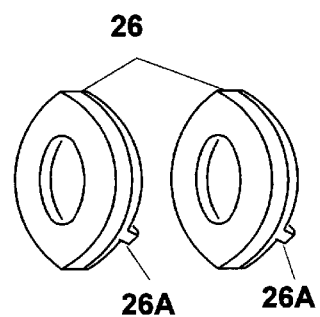
FIG. 8A

TORSIONAL SHOCK ABSORBER FOR BICYCLE

This invention relates to bicycles, and more specifically to bicycle shock absorbers.

BACKGROUND OF THE INVENTION

Bicycles have been used as a means of recreation and transportation for many years. With the advent of the fuel crisis in the 1970's and the rise in overall health consciousness in society, bicycling recently gained even greater popularity. Finally, just recently, mountain biking has become the most popular form of bicycling with sales of mountain bikes surpassing those of ordinary road bikes.

With the increase in the popularity of mountain biking, bicycle developers have been faced with issues that were of little or no concern when most bicycle riders road on the street. Foremost of these issues is the issue of shock absorption devices for a bicycle. Mountain bikers quickly learned that a rough trail could equate to a sore body without proper suspension for the bicycle.

Hence, there have been many recent developments of shock absorbers for bicycles. These developments have tended to consist of a variety of linear shock absorbers placed at various locations on a bicycle frame to provide for front and rear shock absorption. While satisfactory results have been obtained, unfortunately there have been problems associated with traditional shock absorbers for bicycles. Specifically, linear shock absorbers tend to be expensive, high maintenance devices that tend to wear out long before most of the other bicycle parts. Owners have been forced to either buy a new bicycle or replace the shock absorbers, both of which are very costly.

Torsion springs are also well known devices. Torsion springs are excellent for providing suspension because they are very low maintenance, inexpensive, and tend to have a long life that often equals or surpasses that of the equipment on which they are being used. Torsion spring prior use has included many applications, such as: exercise equipment, military equipment, automobiles and trucks. What is needed is a shock absorption device for a bicycle that is low maintenance, inexpensive and has a long life.

SUMMARY OF THE INVENTION

The present invention provides a bicycle with a torsional shock absorber comprised of a torsion spring assembly. The elements of the torsion spring assembly include: housing, a shaft positioned within the housing, a rubbery substance bonded to the interior surface of the housing and the outer surface of the shaft. The torsional shock absorber is mounted on the bicycle such that shock forces are converted into rotational forces tending to rotate the shaft within the housing. These rotational forces are resisted by the spring force created by the rubbery substance within the torsion spring assembly; thereby absorbing the shock forces. In a preferred embodiment, the front and rear portions of the bicycle frame pivot about the pedal spindle axis. The housing of the torsion spring assembly is rigidly connected to the front portion of the bicycle frame in-between the top tube and middle brace and just in front of the seat tube. The rear portion of the bicycle frame is pivotally connected to two torsion arms rigidly connected to the shaft.

BRIEF DESCRIPTION OF THE DRAWINGS

FIG. 7 shows a top view of the torsional shock absorber assembly.

FIGS. 8A–8B show elements for damping the torsional shock absorber assembly.

DETAILED DESCRIPTION OF THE PREFERRED EMBODIMENT

Preferred embodiments of the present invention are described below by reference to FIGS. 1–11.

SHOCK FORCES CONVERTED INTO ROTATIONAL FORCES

Figure 9:
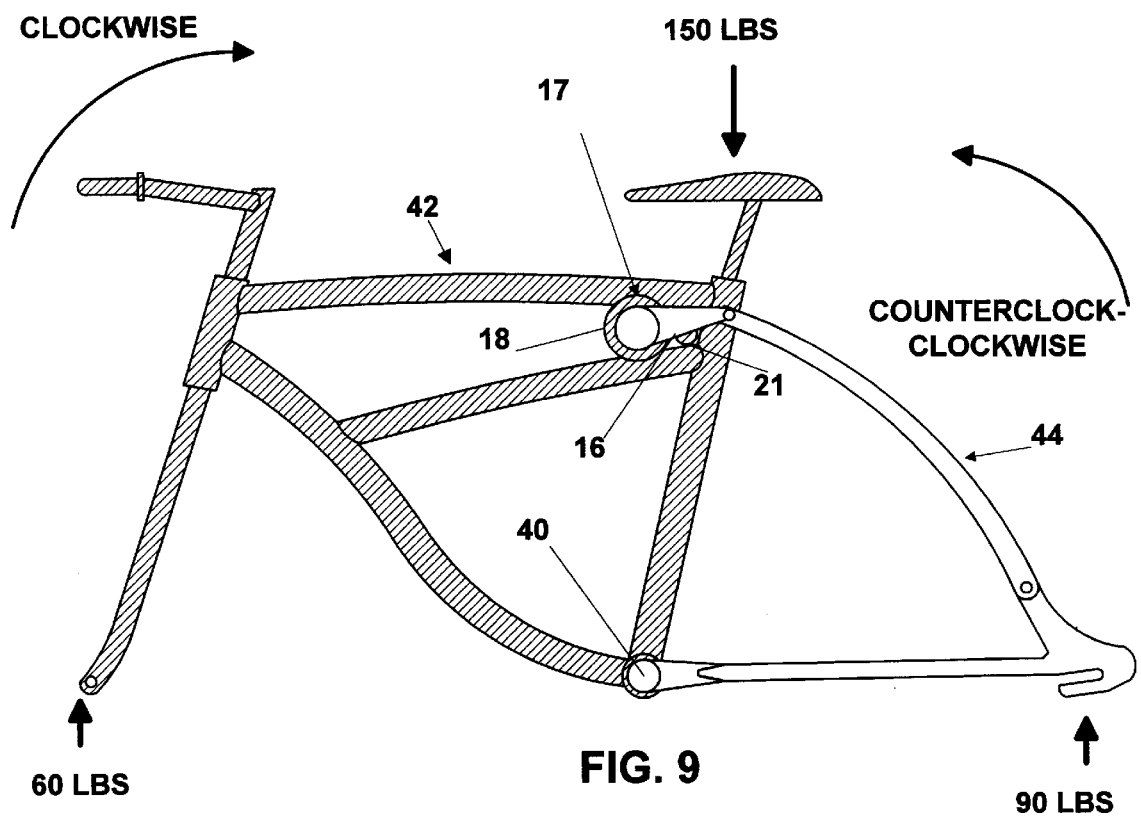
FIG. 9 shows the operation of the torsional rear suspension assembly.

FIG. 9 shows the basic principles of the present invention. The frame of a bicycle shown in FIG. 9 is divided into two parts, a front portion 42 (shown shaded) and a rear portion 44 (unshaded). Both sections are pivotally connected to each other at pedal axis 40 and they pivot about pedal axis 40. A torsion spring assembly is shown at 17. Torsion spring housing 18 is welded to the front portion of the frame and the shaft of the torsion spring assembly 17 is attached to torsion arm 16 which is in turn pivotally connected to rear portion 44. The torsion spring used in this embodiment is rated at about 13 inch-pounds per degree and it is pre-loaded at about 20 degrees or about 260 inch-pounds by pivoting torsion arm 16 counter-clockwise from its relaxed horizontal position. Tube 21 is welded to seat tube 3 and prevents torsion arm 16 from returning to its relaxed position. A 150 pound rider will produce a steady torque of about 300 inch-pounds on torsion spring assembly 17, which will rotate the shaft of assembly 17 about 23 degrees (i.e., 3 degrees beyond the pre-loaded position). Shock forces applied to either front or rear axis by bumps are absorbed by torsion spring assembly 17.

The present invention may be utilized with most pre-existing bicycle frames. However, for the preferred embodiment, a cruiser bicycle was modified. The frame of the cruiser bicycle is shown as bicycle frame 1 in FIG. 1. The procedures for modifying a bicycle to accept the present invention and the use of the present invention are listed below.

Concentric Relative Rotation Bottom Bracket Pivot

Figure 1:
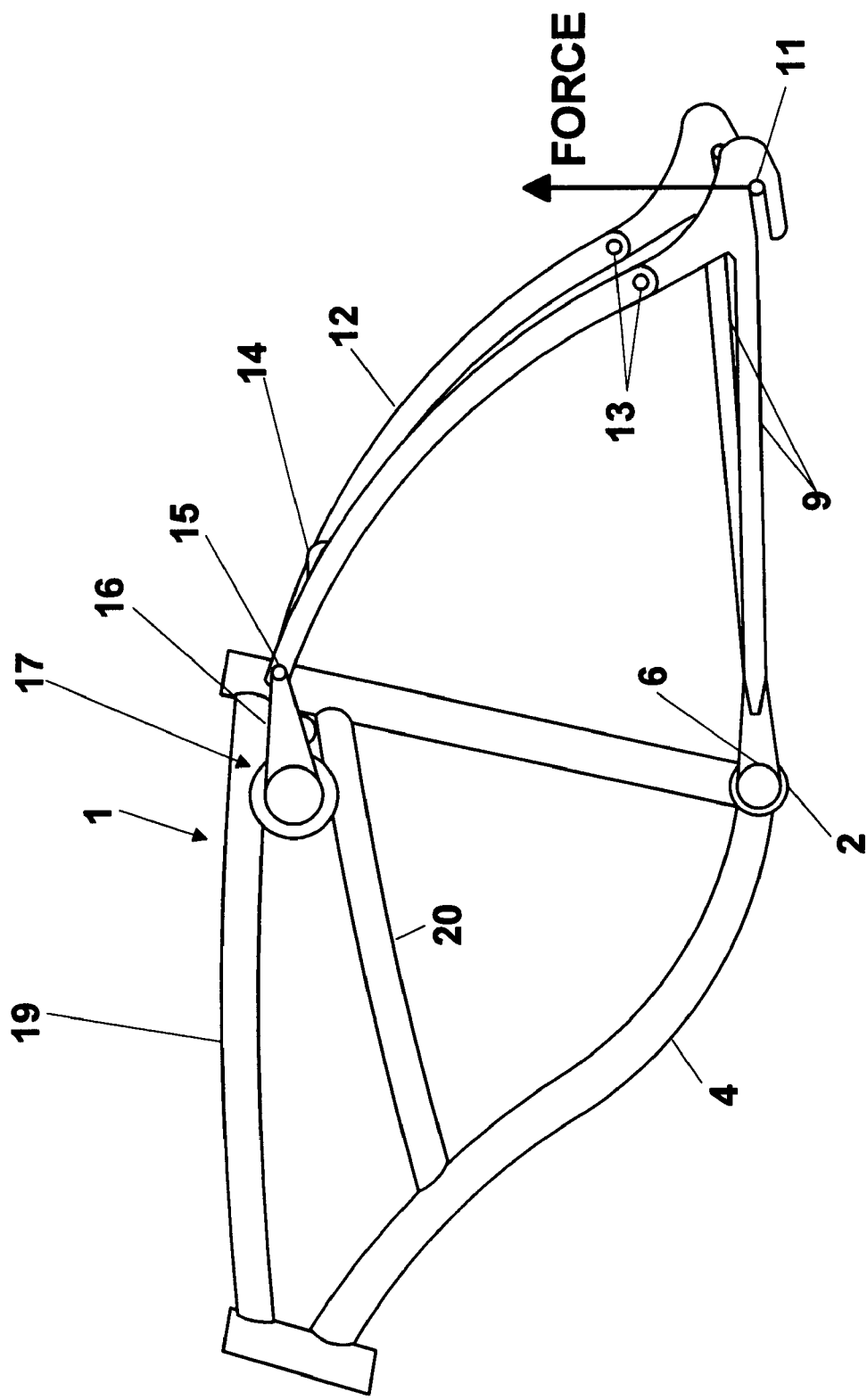
FIG. 1 shows the torsional rear suspension assembly attached to a bicycle frame.
Figure 2:
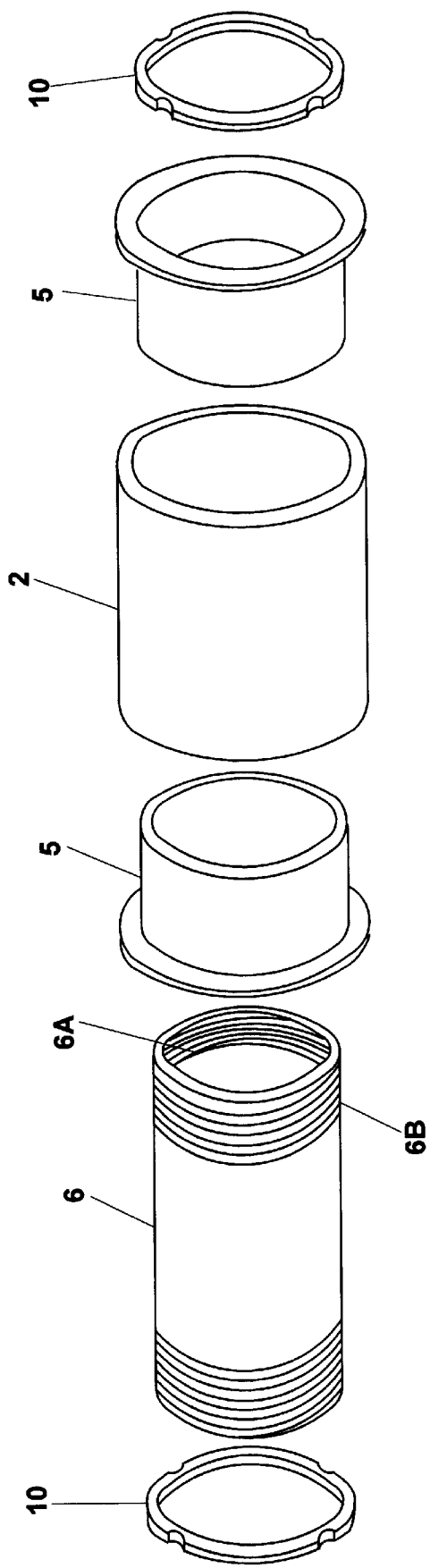
FIG. 2 shows the elements of the bottom bracket pivot assembly.
Figure 3:
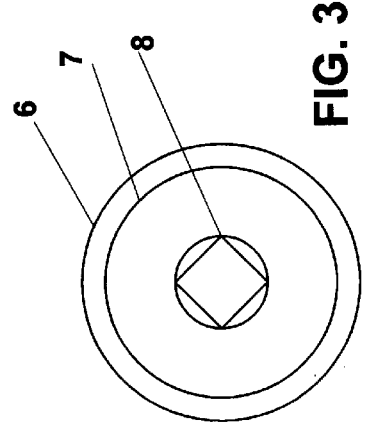
FIG. 3 shows a side view of the bottom bracket pivot assembly.
Figure 4:
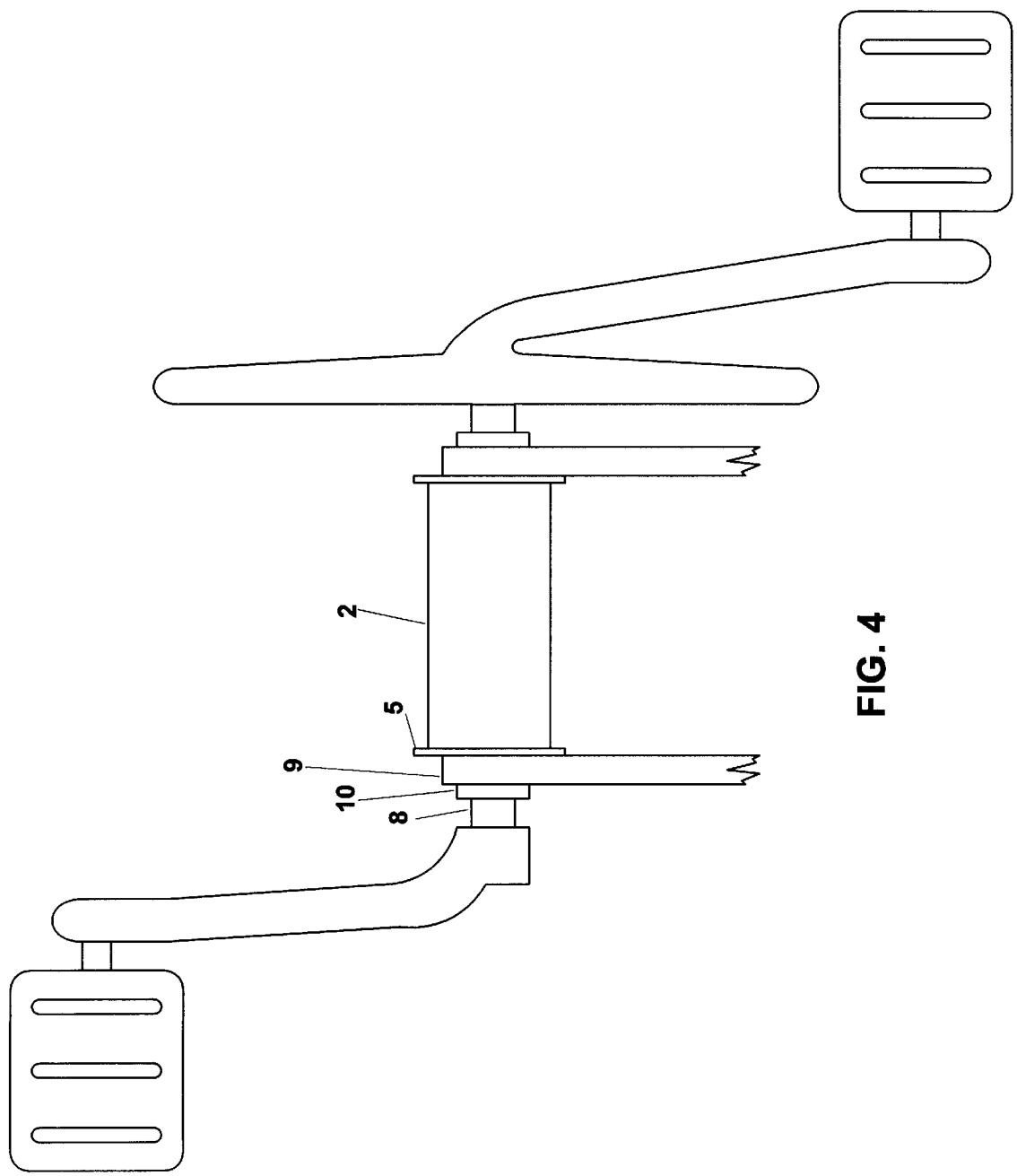
FIG. 4 shows a top view of the bottom bracket pivot assembly.

Aluminum bottom bracket housing 2 is welded to bicycle frame 1 at the intersection of seat support tube 3 and down tube 4, as shown in FIG. 1. The elements that comprise the bottom bracket pivot assembly are illustrated in FIG. 2. Sleeve bearing 5 is a dry, self-lubricating plastic bearing. Sleeve bearing 5 press fits into aluminum bottom bracket housing 2. Aluminum bottom bracket shell 6 slips freely inside both sleeve bearings 5 so as to rotate on sleeve bearings 5. Bottom bracket shell 6 has internal threads 6A so that bearing casings 7 can be threaded onto both sides of bottom bracket shell 6, as shown in FIG. 3. Bottom bracket spindle 8 rotates freely while supported by bearing casings 7. As shown in FIG. 4, swingarms 9 fit over bottom bracket shell 6 and are tightened against sleeve bearings 5 by tightly threading aluminum lock ring 10 on external threads 6B of bottom bracket shell 6.

The operation of the bottom bracket pivot assembly can best be determined by reference to FIGS. 1 and 4. As the bicycle is ridden, vertical forces are applied at the rear wheel and transferred to rear wheel axis 11, as shown in FIG. 1. Force causes swingarms 9 to pivot around bottom bracket shell 6. Referring to FIG. 4, because swingarms 9 are held tightly against sleeve bearings 5 by lock rings 10, the following bottom bracket pivot assembly elements rotate relative to bottom bracket pivot housing 2 along with swingarms 9: lock rings 10, sleeve bearings 5, and bottom bracket shell 6. Bottom bracket housing 2 is welded to the bicycle frame and obviously stays stationary relative to the frame. The bicycle pedals are attached to bottom bracket spindle 8 which is supported by bearing casings 7 and rotates within housing 2 as the pedals are rotated as shown in FIG. 4.

The primary advantage of the above design is that swingarms 9 pivot with respect to spindle 8, avoiding any change in chain length (i.e., the distance between the axis of the pedal gear and the axis of the rear wheel gears) as is the case with swingarms that pivot at any other location. With no change in chain length, this suspension can be used with all single-gear bicycle drivetrain designs, such as BMX, cruiser, city bikes, and any bicycle that uses internally geared hubs, without the need for chain tensioning devices.

Figure 5:
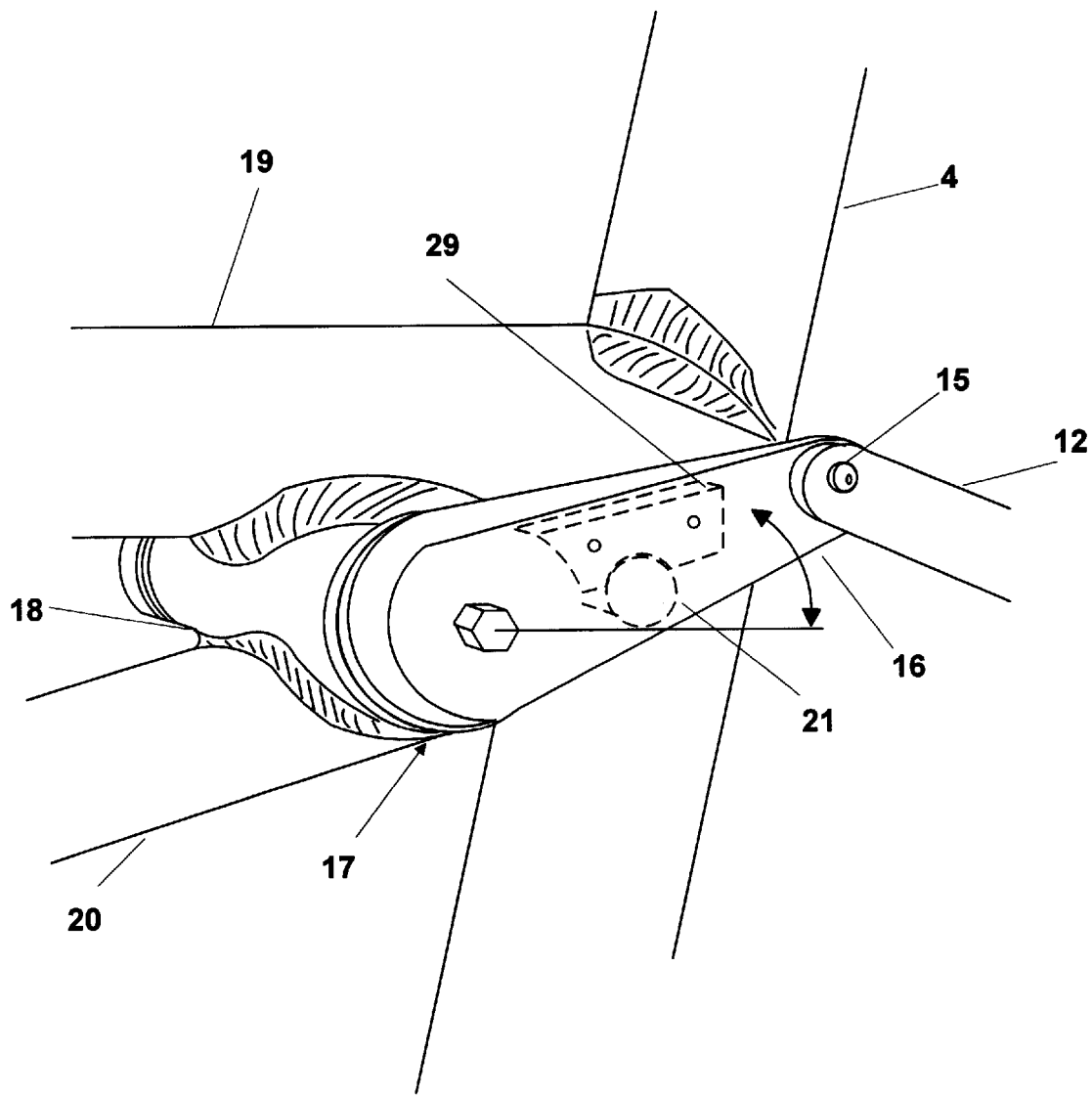
FIG. 5 shows the torsional shock absorber assembly.

As shown in FIG. 1, swingarms 9 are pivotally attached to rear arms 12 at pivot point 13. Rear arms 12 are welded together at bar 14 for support and are pivotally attached to torsion arms 16 at pivot point 15 as shown in FIGS. 1 and 5. Torsion arms 16 are rigidly attached to the shaft of torsional shock absorber assembly 17.

Rubber Torsion Shock Absorber

Aluminum rubber torsion spring housing 18 is welded to the bicycle frame in between top tube 19 and middle brace 20, as shown in FIGS. 1 and 5. Aluminum tube 21 is also welded to the bicycle frame rearward of torsion spring housing 18 and between top tube 19, seat support tube 3 and middle brace 20.

Figure 6:
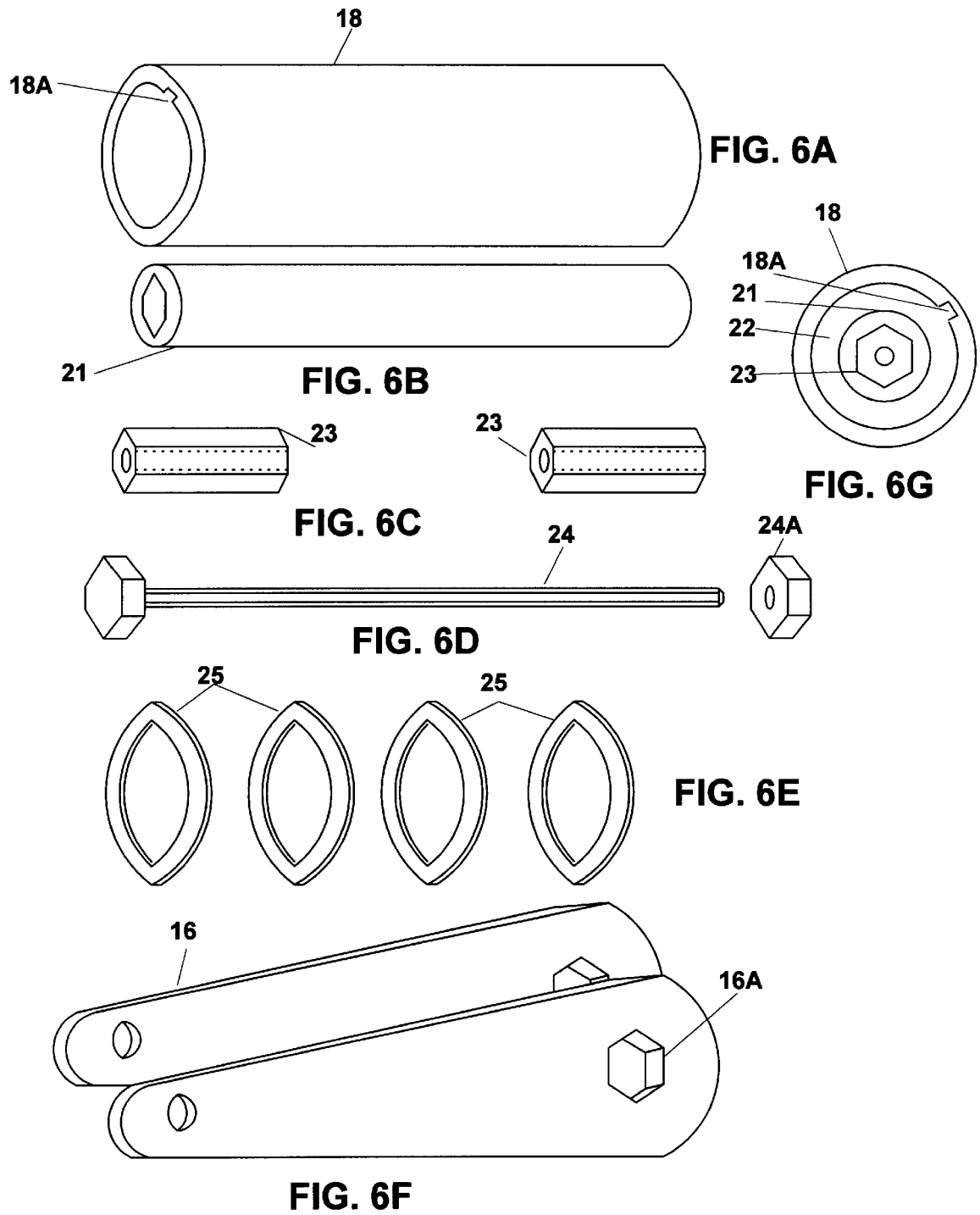
FIGS. 6A–6G show the elements of the torsional shock absorber assembly.

The internal elements of a preferred torsional shock absorber assembly 17 are shown in FIGS. 6 and 7. Aluminum shaft housing 21 is inserted inside torsion spring housing 18. Rubber torsion spring 22 is bonded to the internal smooth surface of torsion spring housing 18 and the external smooth surface of shaft housing 21 as shown in FIG. 6G. Key 18A helps prevent slipping between torsion spring 22 and torsion spring housing 18. A preferred torsion spring arrangement, consisting of torsion spring housing 18, rubber torsion spring 22 and shaft housing 21 is available from B. F. Goodrich Company, at 6061 B. F. Goodrich Boulevard, Blount Island, Jacksonville, Fla. 32226.

Shaft housing 21 has a hexagonal internal shape that corresponds to hexagonal actuation shafts 23, as shown in FIGS. 6G and 6C. Actuation shafts 23 are inserted in both ends of shaft housing 21 so that each shaft 23 extends from each end of shaft housing 21 approximately ½ inch. Plastic washers 25, as shown in FIG. 6E and FIG. 7, are slid over the exposed ends of shaft 23. Torsion arms 16 with hexagonal cutout 16A are then slid over shafts 23. Bolt 24 is threaded through either one of actuation shafts 23 and then out through the other actuation shaft 23. Nut 24A is threaded over the exposed end of bolt 24 until the head of bolt 24 and nut 24A presses tightly against torsion arms 16, as shown in FIG. 7.

The operation of torsional shock absorber assembly 17 can be understood by reference to FIG. 1 and FIG. 7. As the bicycle is ridden, vertical force components are imparted to rear wheel axis 11, which will produce on swingarms 9 counter-clockwise torque around bottom bracket housing 2. As swingarms 9 tend to rotate counter-clockwise, this motion will be transferred to rear arms 12, which are connected to torsion arms 16 at upper pivot axis' 15. Hence, vertical forces on rear wheel axis 11 produces a rotational force component on torsion arms 16. The rotational force component tends to force torsion arms 16 to rotate counter-clockwise. However, torsion arms 16 are connected to actuation shafts 23, which are rigidly connected to shaft housing 21. As shaft housing 21 tends to rotate, its motion is resisted through rubber torsion spring 22 and the shock of the force originally transferred through rear wheel axis 11 is absorbed.

Pre-loading the Rubber Torsion Spring

Preferably, torsional shock absorber assembly 17 is pre-loaded. In other words, better shock absorbing effects are achieved if spring 22 is already is a state of torque prior to use of the bicycle. If there were no pre-loading, the rear suspension of the bicycle would feel more like a pogo stick and less like a true shock absorber.

Pre-loading of shock absorber assembly 17 is best understood by reference to FIGS. 1 and 5. Aluminum tube 21 is welded rearward of torsion spring housing 18. Riveted to both torsion arms 16, are plastic supports 29. The normal position (i.e., no pre-loading) of torsion arms 16 would be horizontal, as indicated in FIG. 5. However, torsion arms 16 are forced counter-clockwise approximately 20 degrees. As rubber torsion spring 22 acts to force downward torsion arms 16, plastic supports 29 brace against aluminum tube 21 and the downward motion is stopped. The result is therefore a preloaded shock absorber assembly 17.

Summary of Operation of Preferred Embodiment

A summary of the operation of the preferred embodiment can be seen by reference to FIG. 9. If a one-hundred and fifty pound bicycle rider sits on the bicycle, roughly 90 pounds of upward force are felt at the rear wheel axis and 60 pounds at the front wheel axis. The shaded section of bicycle frame will tend to rotate clockwise around axis 40 and the non-shaded part of the bicycle will tend to rotate counter-clockwise around axis 40. However, torsional shock absorber assembly 17 will resist the rotation. Moreover, as bumps are encountered in the road by either wheel, vertical forces at the wheel axis will necessarily increase. Torsional shock absorber assembly 17, likewise, will continue to resist further rotation.

Rubber Torsion Shock Absorber—Second Embodiment for Damping

A second embodiment of torsional shock absorber assembly 17 is made by substituting the elements described in FIG. 6E (i.e., plastic washers 25) with elements described in FIGS. 8A and 8B. Instead of placing plastic washers 25 in-between torsion arms 16 and torsion spring housing 18, components are inserted to add a damping effect to the torsional motion resisted by rubber torsion spring 22. As seen in FIG. 8B, rubber torsion spring 22 has key 22B. Elastomer plate 26 is made out of compounded natural polyisoprene. Metal elastomer backing plate 26A is cut to fit at key 22B, as shown in FIG. 8A. Rolling indentor retainer 27 is made out of metal and has 6 holes to accept rolling indentors 28. Also, rolling indentor retainers 27 have a hexagonal internal cutout so as to have a tight fit over actuation shafts 23. Rolling indentors 28 are made out of metal ball bearings and have a diameter of ¼ inch. Their diameter is slightly larger than the diameter of the holes in indentor retainer 27.

Installing Second Embodiment

All procedures of installing the second embodiment are identical to that of the first embodiment through the installation of actuation shafts 23. Elastomer plates 26 are a bonded to elastomer backing plates 26A, which are then keyed to both sides of rubber torsion spring 22 at key 22B. Rolling indentors 28 are then placed against rolling indentor retainers 27 and both are slid over actuation shafts 23 and pressed against elastomer plates 26. Torsion arms 16 are then slid over shafts 23 and the entire assembly is tightened with bolt 24 and nut 24A as described above under the first embodiment.

Operation of the Damper

As torsion arms 16 cause actuation shafts 23 to rotate, indentor retainers 27 rotate as well. However, elastomer plates 26 remain essentially stationary because they are keyed to the end of rubber torsion spring 22 that is bonded to the welded torsion spring housing 18. In-between rotating elastomer plates 26 and indentor retainers 27 are rolling indentors 28. As indentor retainers 27 rotate around shafts 23, rolling indentors roll against elastomer plates 26 dampening the effect of torsional shock absorber assembly 17 through hysteresis losses in the elastomer.

OTHER EMBODIMENTS

Location of the Torsional Shock Absorber Assembly

Figure 10A:
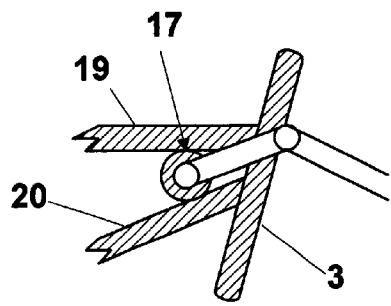
FIGS. 10A–10F show possible locations for the torsional shock absorber assembly.
Figure 10B:
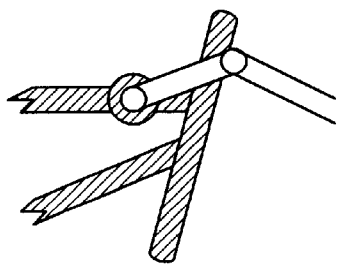
Figure 10C:
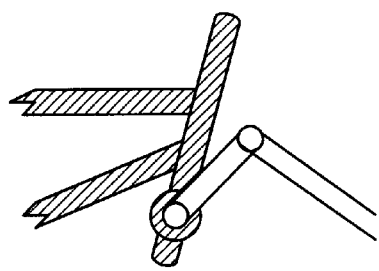
Figure 10D:
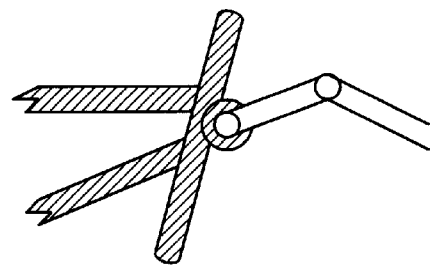
Figure 10E:
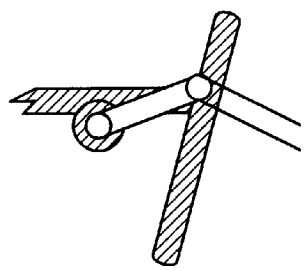
Figure 10F:
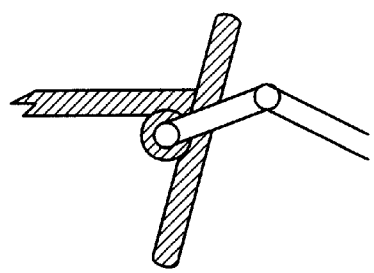

For example, the preferred embodiment described the location of torsional shock absorber assembly 17 as being located in-between top tube 19 and middle brace 20 and just forward of seat support tube 3, as shown in FIG. 10A. However, it would be possible to weld torsional shock absorber assembly 17 in other locations on the bicycle frame as well. For example, it could be welded into top tube 19 (as shown in FIG. 10B), or into seat tube 3 (as shown in FIG. 10C), or behind seat tube 3 (as shown in FIG. 10D), or underneath top tube 19 (as shown in FIG. 10E), or wedged in-between top tube 19 and seat tube 3 (as shown in FIG. 10F).

Other Bicycle Frame Types

Figure 11A:
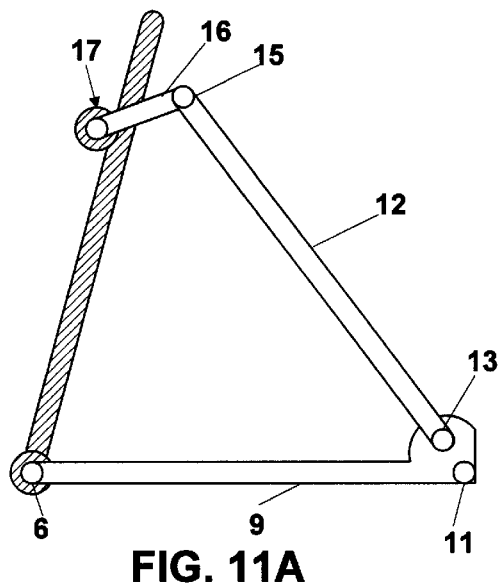
FIGS. 11A–11G show some possible bicycle frames that could use the torsional rear suspension assembly.
Figure 11B:
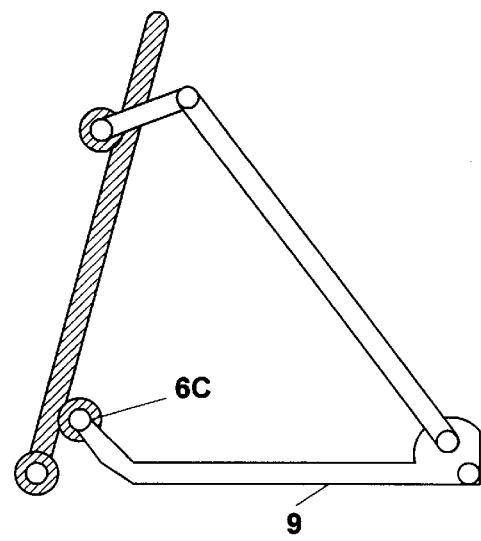
Figure 11C:
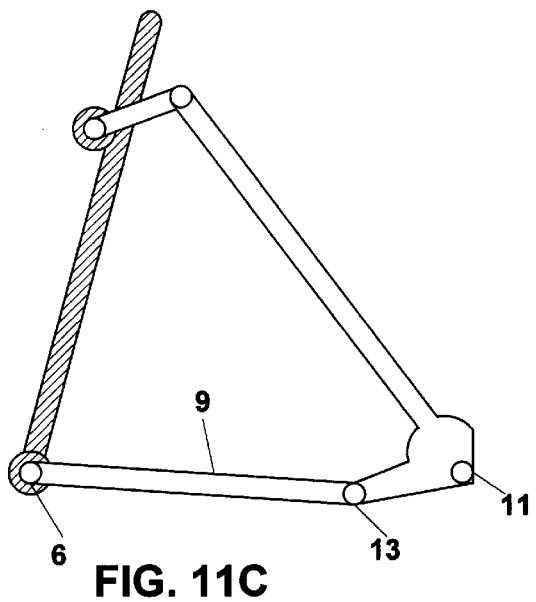
Figure 11D:
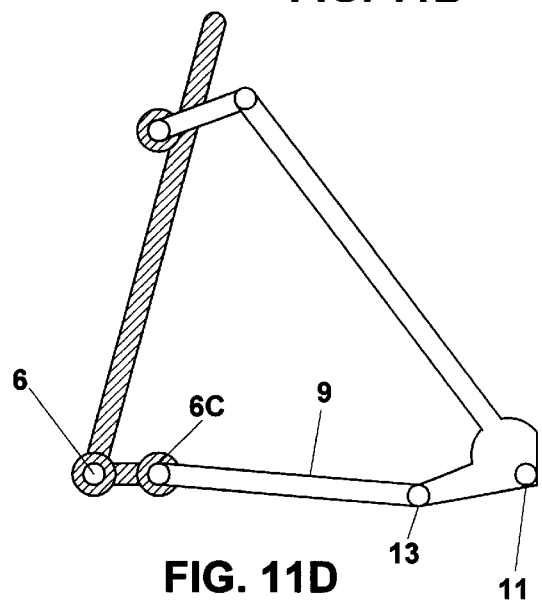
Figure 11E:
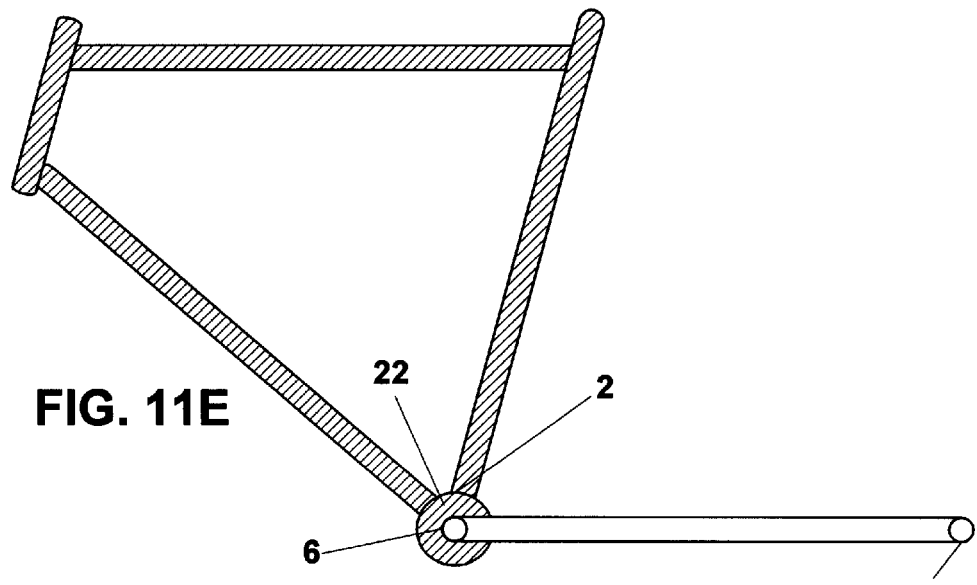
Figure 11F:
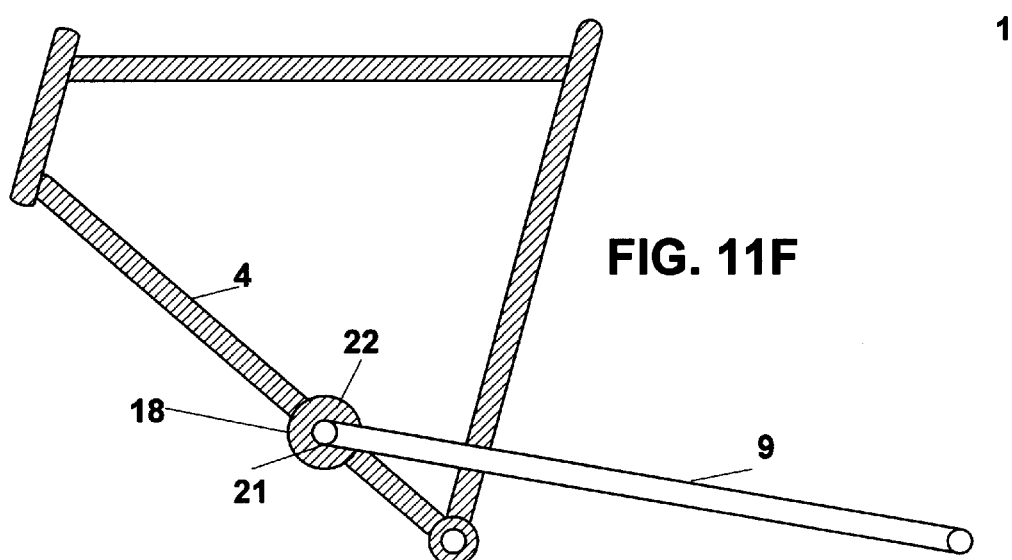
Figure 11G:
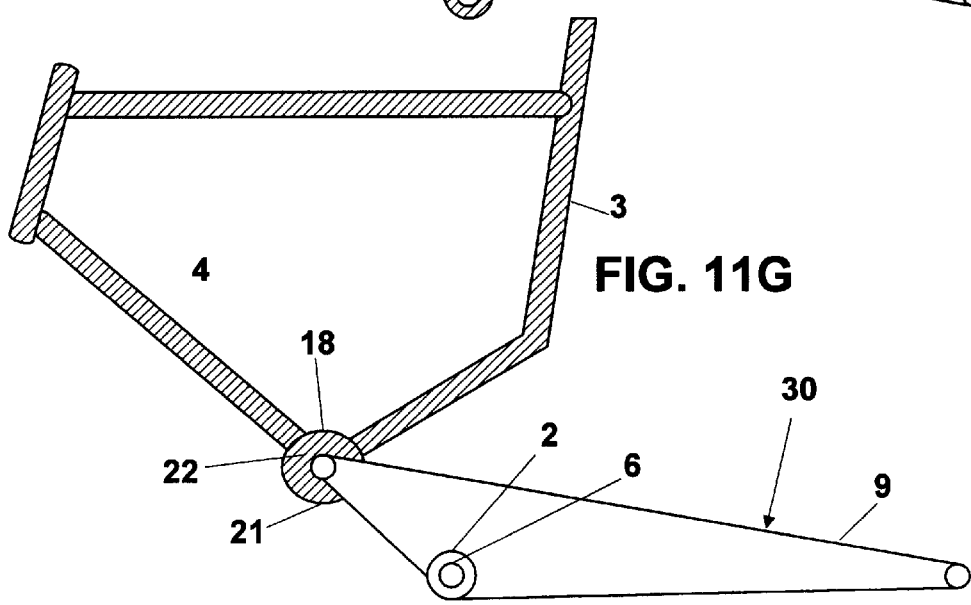

In FIGS. 11A–11G, the shaded parts of the bicycle frame tend to rotate clockwise as vertical force is applied to rear wheel axis 11 and the non-shaded parts tend to rotate counter-clockwise. The preferred embodiment was based on a modification of cruiser bicycle frame, as shown in FIG. 11A. To review, vertical force is transferred through rear wheel axis 11 to cause swingarm 9 to pivot concentric to bottom bracket shell 6. Motion is therefore transferred to rear arm 12 through lower pivot axis 13 and then to torsion arm 16 through upper pivot axis 15. This causes counter-clockwise rotation of torsion arm 16, which is resisted by torsional shock absorber assembly 17. The present invention may also be used with other frame designs. For example, FIG. 11B illustrates a modification of a neutral pivot type rear suspension design. Here the lower pivot point for swingarm 9 is at pivot 6C rather than at bottom bracket shell 6. FIG. 11C illustrates a modification of a Horst-link rear suspension with bottom bracket pivot design. Here, lower pivot 13 is in-between bottom bracket shell 6 and rear wheel axis 11. FIG. 11D illustrates a modification of a traditional Horst-link rear suspension design. Here, pivot 6C is rigidly connected to the bicycle frame rearward of bottom bracket shell 6 and lower pivot 13 is in-between rear wheel axis 11 and pivot 6C. FIGS. 11E–11G are examples of bicycle frames that do not utilize a rear arm 12. FIG. 11E illustrates a modification of a concentric bottom bracket swing arm design. In this design, rubber torsion spring 22 is bonded to the exterior surface of bottom bracket shell 6 and to the interior surface of bottom bracket housing 2. FIG. 11F illustrates a modification of a cantilever swingarm design. In this design, torsion spring housing 18 is welded to down tube 4, rubber torsion spring 22 is bonded to the interior surface of torsion spring housing 18 and to the exterior surface of shaft housing 21, which is rigidly connected to swing arm 9. FIG. 11G illustrates a modification of a floating drivetrain design. In this design, swingarm 9 and bottom bracket housing 2 containing spindle 6 are joined to form one large swingarm 30. Large swingarm 30 rigidly connects to shaft housing 21. Rubber torsion spring 22 is bonded to the exterior surface of shaft housing 21 and to the interior surface of torsion spring housing 18. Torsion spring housing 18 is welded at the intersection of seat tube 3 and down tube 4.

Other Possible Uses of a Torsion Spring Besides Rear Suspension

There are other possible uses of a rubber torsion spring on a bicycle besides for rear suspension. For example, a torsion spring could be place in-between the handlebars and the front wheel axis to provide front suspension. Or, a torsion spring could be placed on the handlebars to provide shock absorption for the bicycle rider's hands. Or a torsion spring could be placed in-between the bicycle seat and the bicycle frame for shock absorption or on the bicycle's stem.

Other Modifications

For rubber torsion spring 22, the type of rubber used was natural rubber. Synthetic rubbers are also possible as well as other rubbery type substances.

For the preferred embodiment, one torsional shock absorber assembly 17 was described, as shown if FIG. 1. However, it is possible to put a rubber torsion spring at every location where there is a pivot. For example, referring to FIG. 1, a rubber torsion spring could be place in-between bottom bracket shell 6 and bottom bracket housing 2.

Furthermore, a torsional spring assembly could be place at lower pivot axis 13 and at upper pivot axis 15.

Although the above-preferred embodiments have been described with specificity, persons skilled in this art will recognize that many changes to the specific procedures disclosed above could be made without departing from the spirit of the invention. Therefore, the scope of the invention is to be determined by the appended claims and their legal equivalents.

I claim:

1. A bicycle with a shock absorption assembly comprising:
    A) a bicycle frame defining a front portion and a rear portion, said front portion and said rear portion being pivotally connected at a pivot point,
    B) at least one torsion spring assembly comprising a:
        1) a torsion spring housing defining an inner surface,
        2) a shaft defining an outer surface,
        3) a rubbery substance bonded to the inner surface of said housing and the outer surface of said shaft
    wherein, said front portion of said frame is attached to said torsion spring housing and said rear portion is attached to said shaft such that shock forces acting on said front or rear wheels are absorbed in said torsion spring assembly.

2. A bicycle as in claim 1, wherein said shaft is comprised of a shaft housing and an actuation shaft positioned partially within said shaft housing and extending beyond said shaft housing.

3. A bicycle as in claim 1, wherein said pivotal connection means comprises:
    A) a bottom bracket housing welded to said bicycle frame,
    B) at least one sleeve bearing to rotate inside said bottom bracket housing,
    C) a bottom bracket shell to rotate inside said at least one sleeve bearing,
    D) at least one bearing casing threaded into said bottom bracket shell,
    E) a bottom bracket spindle to rotate on said at least one bearing casing,
    F) said swingarm rigidly connected to a bottom bracket shell,
    wherein, said swingarm pivots concentrically and relative to axis formed by said bottom bracket spindle and said bottom bracket spindle rotates independently of said pivoting of said swingarm.

4. A bicycle as in claim 3, wherein said connection means comprises:
    A) said swingarm,
    B) a rear arm pivotally connected to said swingarm at a lower pivot, and
    C) at least one torsion arm pivotally connected to said rear arm at an upper pivot and connected to said shaft of said at least one torsion spring assembly.

5. A bicycle as in claim 4, wherein said torsion spring housing is welded to said bicycle frame in-between a top tube and middle brace of said bicycle frame and just forward of a seat support tube of said bicycle frame, and said shaft of said torsion spring comprises:
    A) a shaft housing, and
    B) at least one actuation shaft slid inside said shaft housing, and
    C) a nut and bolt assembly to secure said at least one torsion arm tightly against said torsion spring housing,
    wherein said at least one torsion arm is rigidly connected to said at least one actuation shaft to apply said torque which is resisted by said rubbery substance.

6. A bicycle as in claim 1, wherein said torsion spring assembly further comprises:
    A) at least one elastomer plate keyed to said rubbery substance,
    B) a plurality of rolling indentors to roll against said elastomer plate, and
    C) at least one rolling indentor retainer to hold said plurality of rolling indentors against said elastomer plate,
    D) a nut and bolt assembly to press at least one torsion arm, said at least one elastomer plate, said plurality of rolling indentors, and said at least one rolling indentor retainer tightly against said torsion spring housing for damping of said torque.

7. A bicycle as in claim 6, wherein said shaft comprises:
    A) a shaft housing,
    B) at least one actuation shaft slid inside said shaft housing.

8. A bicycle as in claim 1, wherein said torsion spring assembly is a pre-loaded torsion spring assembly.

9. A bicycle as in claim 8, wherein said pre-loaded torsion spring assembly comprises:
    A) at least one torsion arm connecting said shaft to said connecting means,
    B) at least one plastic support riveted to said at least one torsion arm, and
    C) a tube welded to said bicycle frame rearward of said torsion spring,
    wherein said plastic support is braced against said tube to pre-load said torsion spring assembly.

10. A bicycle as in claim 1, wherein said rubbery substance is rubber.

11. A bicycle as in claim 10, wherein said rubber is natural rubber.

12. A bicycle as in claim 1, wherein said at least one torsion spring assembly is a plurality of torsion spring assemblies located at a plurality of pivot locations of said torsional rear suspension assembly.

13. A bicycle as in claim 1, wherein said torsion spring housing is welded into the top tube of said bicycle frame.

14. A bicycle as in claim 1, wherein said torsion spring housing is welded into the seat tube of said bicycle frame.

15. A bicycle as in claim 1, wherein said torsion spring housing is welded behind the seat tube of said bicycle frame.

16. A bicycle as in claim 1, wherein said torsion spring housing is welded underneath the top tube of said bicycle frame.

17. A bicycle as in claim 1, wherein said torsion spring housing is welded in-between the top tube and seat tube of said bicycle frame.

18. A bicycle as in claim 1, wherein said bicycle frame is a modified cruiser frame.

19. A bicycle as in claim 1, wherein said bicycle frame is a modified neutral pivot type rear suspension frame.

20. A bicycle as in claim 1, wherein said bicycle frame is a modified Horst-link rear suspension with concentric bottom bracket pivot frame.

21. A bicycle as in claim 1, wherein said bicycle frame is a modified traditional Horst-link rear suspension frame.

22. A bicycle as in claim 1, wherein said bicycle frame is a modified concentric bottom bracket swingarm frame.

23. A bicycle as in claim 1, wherein said bicycle frame is a modified cantilever swingarm frame.

24. A bicycle as in claim 1, wherein said bicycle frame is a modified floating drivetrain frame.

* * * * *